(12) United States Patent
Vanek

(10) Patent No.: US 8,063,885 B2
(45) Date of Patent: Nov. 22, 2011

(54) BALLOT MARKING SYSTEM AND APPARATUS UTILIZING PIVOTAL TOUCHSCREEN

(75) Inventor: Joseph M. Vanek, Clarendon Hills, IL (US)

(73) Assignee: ES&S AutoMARK, LLC, Omaha, NE (US)

( * ) Notice: Subject to any disclaimer, the term of this patent is extended or adjusted under 35 U.S.C. 154(b) by 12 days.

(21) Appl. No.: 10/454,002

(22) Filed: Jun. 4, 2003

(65) Prior Publication Data

US 2004/0246281 A1 Dec. 9, 2004

(51) Int. Cl.
*G06F 3/041* (2006.01)
*G06F 11/00* (2006.01)
*G06K 17/00* (2006.01)

(52) U.S. Cl. .......................... 345/173; 235/386; 705/12

(58) Field of Classification Search ............... 345/157, 345/173; 361/681, 683; 400/83; 705/12; 710/303; 235/51, 386, 375
See application file for complete search history.

(56) References Cited

U.S. PATENT DOCUMENTS

| | | | |
|---|---|---|---|
| 4,021,780 A | 5/1977 | Narey | |
| 4,300,123 A | 11/1981 | McMillin | |
| 4,373,134 A | 2/1983 | Grace | |
| 4,479,194 A | 10/1984 | Fogg | |
| 4,641,240 A | 2/1987 | Boram | |
| 4,813,708 A | 3/1989 | Narey | |
| 4,859,092 A * | 8/1989 | Makita | ............................ 400/83 |
| 4,968,873 A | 11/1990 | Dethloff | |
| 5,189,288 A | 2/1993 | Anno et al. | |
| 5,218,528 A | 6/1993 | Wise | |
| 5,221,831 A | 6/1993 | Geiszler | |
| 5,248,872 A | 9/1993 | Stewart | |
| 5,257,011 A | 10/1993 | Beigel | |
| 5,272,318 A | 12/1993 | Gorman | |
| 5,278,753 A | 1/1994 | Graft | |
| 5,396,218 A | 3/1995 | Olah | |
| 5,505,421 A * | 4/1996 | Marthaler | .................. 248/442.2 |
| 5,566,327 A | 10/1996 | Sehr | |
| 5,583,329 A | 12/1996 | Davis | |
| 5,610,383 A | 3/1997 | Chumbley | |
| 5,612,871 A | 3/1997 | Skogmo | |
| 5,635,726 A | 6/1997 | Zavislan | |
| 5,644,469 A * | 7/1997 | Shioya et al. | ................. 361/681 |
| 5,661,470 A | 8/1997 | Karr | |

(Continued)

FOREIGN PATENT DOCUMENTS

IT 1234224 11/1988

(Continued)

OTHER PUBLICATIONS

National Computer Systems, Inc., Application Solutions, Image Scanner Brochure, Apr. 1991.

(Continued)

*Primary Examiner* — Srilakshmi K Kumar
(74) *Attorney, Agent, or Firm* — Stinson Morrison Hecker LLP

(57) ABSTRACT

A ballot marking system and apparatus for marking a paper ballot listing a plurality of candidates which includes a marking space for each candidate which can be either hand-marked by a voter, or machine-marked by the marking apparatus. The marking apparatus includes a touchscreen device on which the voter can enter his selections. The touchscreen is pivotally mounted atop the ballot marking apparatus such that it fits within a recess in the apparatus housing when in its closed position, and is ergonomically presented to the voter when in its open position.

4 Claims, 5 Drawing Sheets

U.S. PATENT DOCUMENTS

| | | | |
|---|---|---|---|
| 5,675,628 A | 10/1997 | Hokkanen | |
| 5,689,654 A * | 11/1997 | Kikinis et al. | 710/303 |
| 5,821,508 A | 10/1998 | Willard | |
| 5,861,873 A * | 1/1999 | Kikinis | 345/157 |
| 5,875,432 A | 2/1999 | Sehr | |
| 5,878,399 A * | 3/1999 | Peralto | 705/12 |
| 5,936,527 A | 8/1999 | Isaacman | |
| 6,077,106 A | 6/2000 | Mish | |
| 6,078,928 A | 6/2000 | Schnase | |
| 6,079,624 A | 6/2000 | Apperson et al. | |
| 6,081,793 A | 6/2000 | Challener | |
| 6,097,301 A | 8/2000 | Tuttle | |
| 6,112,240 A | 8/2000 | Pogue | |
| 6,134,399 A | 10/2000 | Hino et al. | |
| 6,250,548 B1 | 6/2001 | McClure | |
| 6,266,236 B1 * | 7/2001 | Ku et al. | 361/681 |
| 6,353,529 B1 * | 3/2002 | Cies | 361/681 |
| 6,412,692 B1 | 7/2002 | Miyagawa | |
| 6,430,038 B1 * | 8/2002 | Helot et al. | 361/681 |
| 6,606,082 B1 | 8/2003 | Zuberec et al. | |
| 6,607,137 B2 | 8/2003 | Morales | |
| 6,688,517 B1 * | 2/2004 | McClure et al. | 235/51 |
| 6,694,045 B2 | 2/2004 | Chung | |
| 6,769,613 B2 | 8/2004 | McDermott et al. | |
| 6,778,196 B2 * | 8/2004 | Nakamura | 345/680 |
| 6,779,727 B2 | 8/2004 | Warther | |
| 6,799,723 B2 * | 10/2004 | Kotob et al. | 235/386 |
| 6,842,338 B2 * | 1/2005 | Iredale | 361/683 |
| 6,854,644 B1 | 2/2005 | Bolton | |
| 6,892,944 B2 | 5/2005 | Chung | |
| 6,923,584 B2 * | 8/2005 | Namekawa et al. | 400/625 |
| 6,942,142 B2 | 9/2005 | Barmettler | |
| 7,077,313 B2 | 7/2006 | Chung | |
| 2001/0013547 A1 | 8/2001 | Kotob | |
| 2001/0035455 A1 | 11/2001 | Davis | |
| 2002/0066780 A1 | 6/2002 | Balolia | |
| 2002/0072961 A1 | 6/2002 | McDermott | |
| 2002/0074399 A1 | 6/2002 | Hall | |
| 2002/0084325 A1 | 7/2002 | Reardon | |
| 2002/0133396 A1 | 9/2002 | Barnhart | |
| 2002/0161628 A1 | 10/2002 | Lane Poor et al. | |
| 2003/0026462 A1 | 2/2003 | Chung | |
| 2003/0034393 A1 | 2/2003 | Chung | |
| 2003/0062411 A1 | 4/2003 | Chung et al. | |
| 2003/0066872 A1 | 4/2003 | McClure | |
| 2003/0136835 A1 | 7/2003 | Chung | |
| 2003/0173404 A1 | 9/2003 | Chung | |
| 2003/0178484 A1 | 9/2003 | Vadura et al. | |
| 2004/0046021 A1 | 3/2004 | Chung | |
| 2004/0140357 A1 | 7/2004 | Cummings | |
| 2004/0169077 A1 | 9/2004 | Petersen et al. | |

FOREIGN PATENT DOCUMENTS

| | | |
|---|---|---|
| JP | 07246732 A | 9/1995 |

OTHER PUBLICATIONS

National Computer Systems, Inc., Intelligent Character Recognition, Presentation to NCS Information Services Employees, Dec. 19, 1991.

Mary Bellis, The History of Voting Machines, About: Inventors, Nov. 2000.

County of Travis, State of Texas, Report of Findings and Recommendations, May 1999.

Douglas Jones, A brief Illustrated History of Voting, The Voting and Electionc Web Pages—U of Iowa, 2001.

Michael Stanton, The Importance of Recounting Votes, website of the Agencia O Estado de Sao Paulo, Nov. 13, 2000.

Peter Neumann, Internet and Elctronic Voting, Forum on Risks to the Public in Computers and Related Systems, Dec. 12, 2000.

Bruce Schneier, Voting and Technology, Cryto-Gram, Dec. 15, 2000.

Westinghouse, W-600B Ballot-Document Specification Manual, May 1978.

Westinghouse Datascore Systems, Optical Mark Reader Systems, 1978.

Data Mark Systems, Sales proposal for Santa Monica County, Mar. 1979.

Douglas Jones, Counting Mark-Sense Ballots, from the Voting and Election Web Pages—U of Iowa, Feb. 2002.

Tri-Tek Industries, Engineering Examination of the Data mark Systems DMS-600 Processing System, May 30, 1978.

* cited by examiner

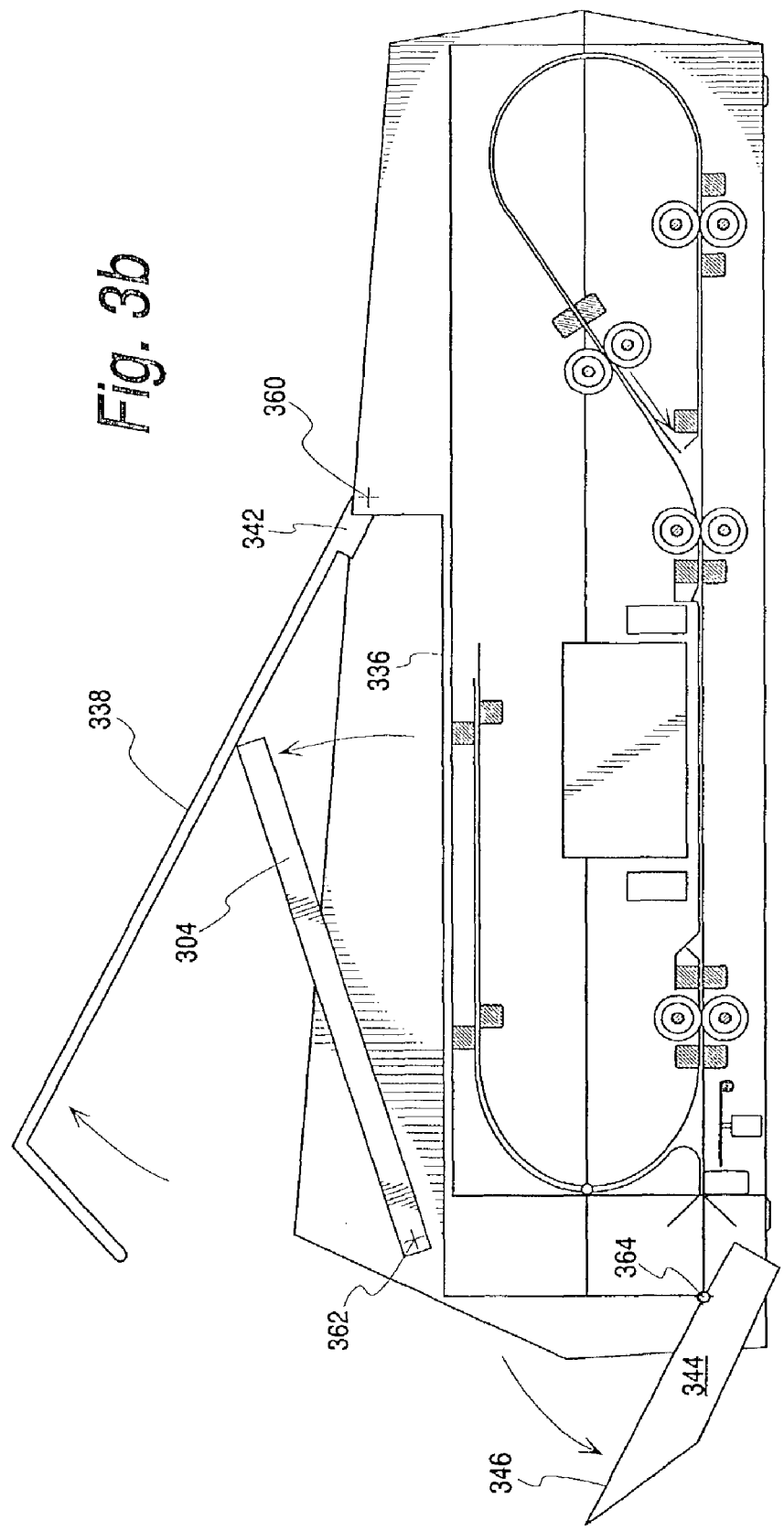

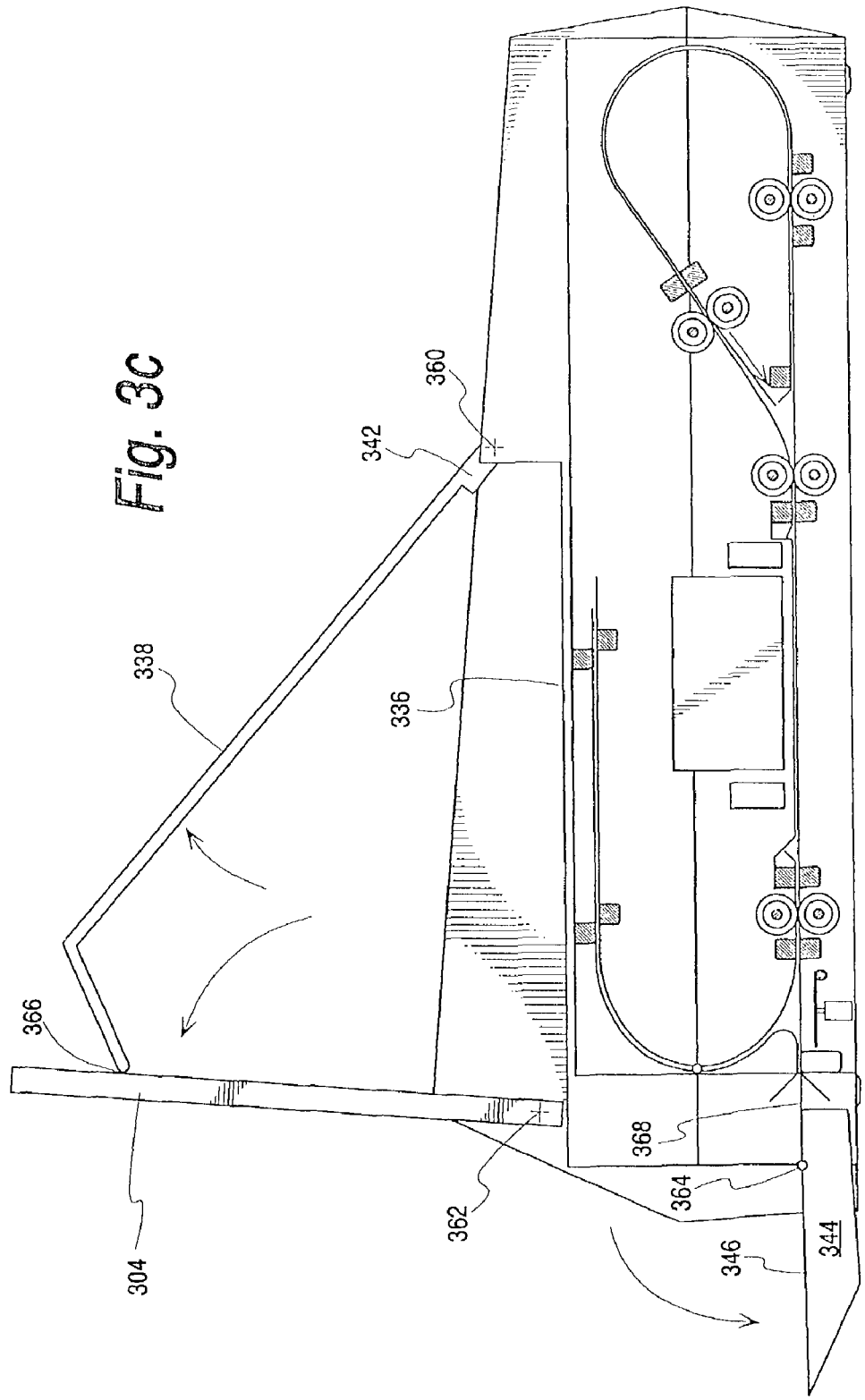

BALLOT MARKING SYSTEM AND APPARATUS UTILIZING PIVOTAL TOUCHSCREEN

BACKGROUND OF THE INVENTION

The present invention relates generally to systems, methods and apparatus for conducting elections, and particularly, to a system, method and apparatus which utilizes a physical ballot, formed of a markable material, such as paper, cardboard, or a thin plastic sheet, or the like, which can be electronically marked by an electronic voting station, and then visually or otherwise verified by the voter, electronically scanned and tallied, and preserved in a ballot box for recount purposes.

Traditionally, elections for public office in the United States have been conducted with voting systems utilizing hand-marked paper ballots. Typically, in such systems a paper ballot is issued to a verified voter by an election judge. The voter takes the ballot to a voting booth, where he manually marks his selections by placing marks or punch holes in marking spaces associated with the candidates he or she selects. The marked ballot is then taken by the voter to a ballot box where it is inserted and stored for subsequent hand or machine counting.

In recent years, the traditional system has been improved with the use of a ballot scanner to tally the hand-marked ballots as they are inserted into the ballot box. This has the advantage of making vote tallies immediately available at the close of polling, and, with scanners so-equipped, of preventing unintentional under-votes and over-votes. However, one drawback of the traditional system remains in that there is no provision for assisting voters who have a physical impairment, which would interfere with the manual marking of a ballot. Previous attempts at assisting such impaired voters have utilized electronic voting terminals wherein, instead of presenting candidate choices on a paper ballot, candidate choices are serially presented to the voter on large, easily viewable touchscreen displays. When the voter has made his selections, the results are tallied within the voting terminal, the total votes for each candidate being read from the terminal electronically or by means of a paper tape at the close of the polling place.

One drawback of electronic voting terminals is that there is no satisfactory means for auditing the voting process, i.e. confirming that each vote is tallied as voted, and that no votes are tallied which were not voted. Furthermore, there is no means for an individual voter to confirm for his or herself that his or her vote has actually been counted. Attempts at addressing these deficiencies have centered on the use of a paper tape or slip printed concurrently with each voter's voting. Such tapes and slips, which bear little or no resemblance to a ballot, have proven difficult to interpret by the voter and do not confirm that the vote has been actually tallied.

Another drawback of the use of the electronic voting terminals is that they are inherently less efficient since voters require more time to electronically vote their ballot than is required to mark or punch a paper ballot providing the same candidate choices. Consequently, to avoid long lines at a polling place, a large number of electronic voting stations must be provided, if such stations are utilized as the sole means of voting. This imposes an undesirable cost and space burden on voting jurisdictions, since the electronic voting stations are expensive to own and maintain and require additional space in use and in storage.

Accordingly, it is the general object of the invention to provide a new and improved voting system, method and apparatus.

It is a more specific object of the invention to provide an improved voting system which utilizes a voter-readable and machine-readable physical ballot which can be electronically marked at an electronic voting station by means of a touch screen voting terminal and associated marking device.

It is a still more specific object of the invention to provide a ballot marking system and apparatus having a touchscreen voter interface wherein the touchscreen is pivotally mounted to the apparatus housing so as to retract into a recess in the housing for protection during storage of the apparatus.

SUMMARY OF THE INVENTION

The invention is generally directed to a ballot marking apparatus adapted to mark a user-readable ballot containing a plurality of races in accordance with the selections made by a voter, each of the races having a plurality of candidates, the apparatus comprising: a housing having a top surface, a bottom surface, a front surface and a rear surface; a display screen viewable by the voter; the housing including a recess in the top surface for receiving the display element; and the display element being pivotally mounted to the housing so as to pivot from a retracted position wherein the display element is substantially entirely contained within the housing, to an extended position wherein the display element is positioned generally perpendicular to the top surface near the front surface of the housing.

BRIEF DESCRIPTION OF THE DRAWINGS

The features of the present invention which are believed to be novel, are set forth with particularity in the appended claims. The invention, together with the further objects and advantages thereof, may best be understood by reference to the following description taken in conjunction with the accompanying drawings, in the several figures of which like reference numerals identify like elements, and in which:

FIGS. 3a-3c are a series of diagramatic perspective views showing the pivotal features of the touchscreen and voter assistance terminal according to the present invention.

DESCRIPTION OF THE PREFERRED EMBODIMENT

Figure 1:
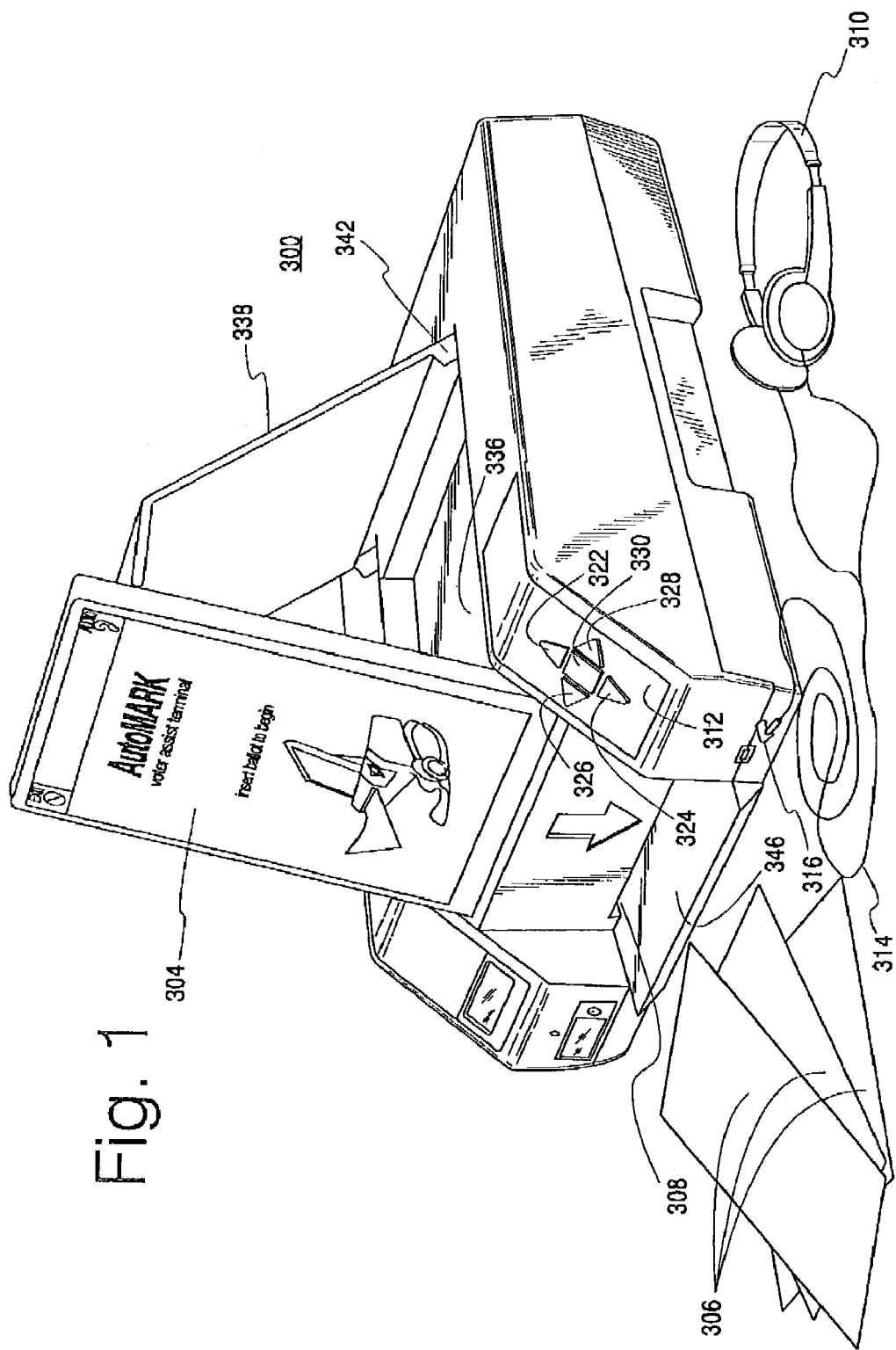
FIG. 1 is a perspective view of the voter assistance terminal for use according to the voting system of the present invention shown in its open and ready to use position.

Referring to the drawings, and particularly to FIG. 1, a voter assistance terminal 300 constructed in accordance with the invention comprises a ballot marking device 302 and touchscreen or voting terminal 304. The preferred embodiment of this voter assistance terminal 300 provides for the marking device 302 to be connected to the touchscreen 304 via a flexible cable (not shown) which may have conventional connectors to facilitate the closing and transport of the voter assistance terminal 300. (See FIG. 2)

Voter assistance terminal 300 is used to mark a pre-printed physical ballot. In particular, an election judge, after confirming the identity and registration of the voter, issues a pre-printed paper ballot 306 to the voter. The voter then has the option of either manually marking the ballot 306 in the conventional way, or of inserting the ballot into a ballot receiving slot 308 at the front of the marking device 302 of the voter assistance terminal 300 for electronic marking. The terminal 300 draws in the ballot 306 and scans a preprinted code on the ballot to determine which form or style of ballot has been inserted. It then presents a series of menu-driven voting choices on its preferably color touchscreen 304 corresponding to that particular ballot style.

In the event that the voter is in need of language support, for example he or she cannot read the English language, the voting menus on the touchscreen 304 can be presented in any number of different languages and then the voter can more readily navigate through these menus. Additionally, in the event that the voter has diminished motor skills, is somewhat visually impaired, or is in some other way physically handicapped and cannot vote in the conventional manner, he or she simply navigates through these touchscreen menus. Furthermore, in the event that the voter cannot use the touchscreen 304 due to the severe physical impairment, blindness or any other reason, he or she can navigate through these menus via a headphone 310 and sub-panel 312 combination. More particularly, a blind voter (for example) would wear the headphones 310 which are connected to the marking device 302 via headphone wire 314 and jack 316 into plug 318.

Although the headphones may be used in conjunction with the touchscreen display, the display may shut down (turn black) when the voter so elects or when the jack 316 is inserted into plug 318 in order to preserve the voter's privacy as he or she navigates through these menus. As such, the sub-panel comprises, preferably four arrow-shaped key switches, up 322, down 324, left 326, right 328 and a center enter key 330. The blind voter then navigates through the menus using these keys in conjunction with pre-recorded, digitized audio prompts heard through headphones 310.

In any event, the voter assistance terminal 300 accumulates the voters choices in its internal memory during this menu driven (visual, audio, or both) navigation. When the voter has finished with his or her choices, he or she is prompted to mark his or her ballot. The preprinted ballot is then marked according to these choices using its internal print mechanism. The ballot is then fed back to the voter through slot 308 for confirmation and insertion into the scanner, where it is validated and tallied.

Figure 2:
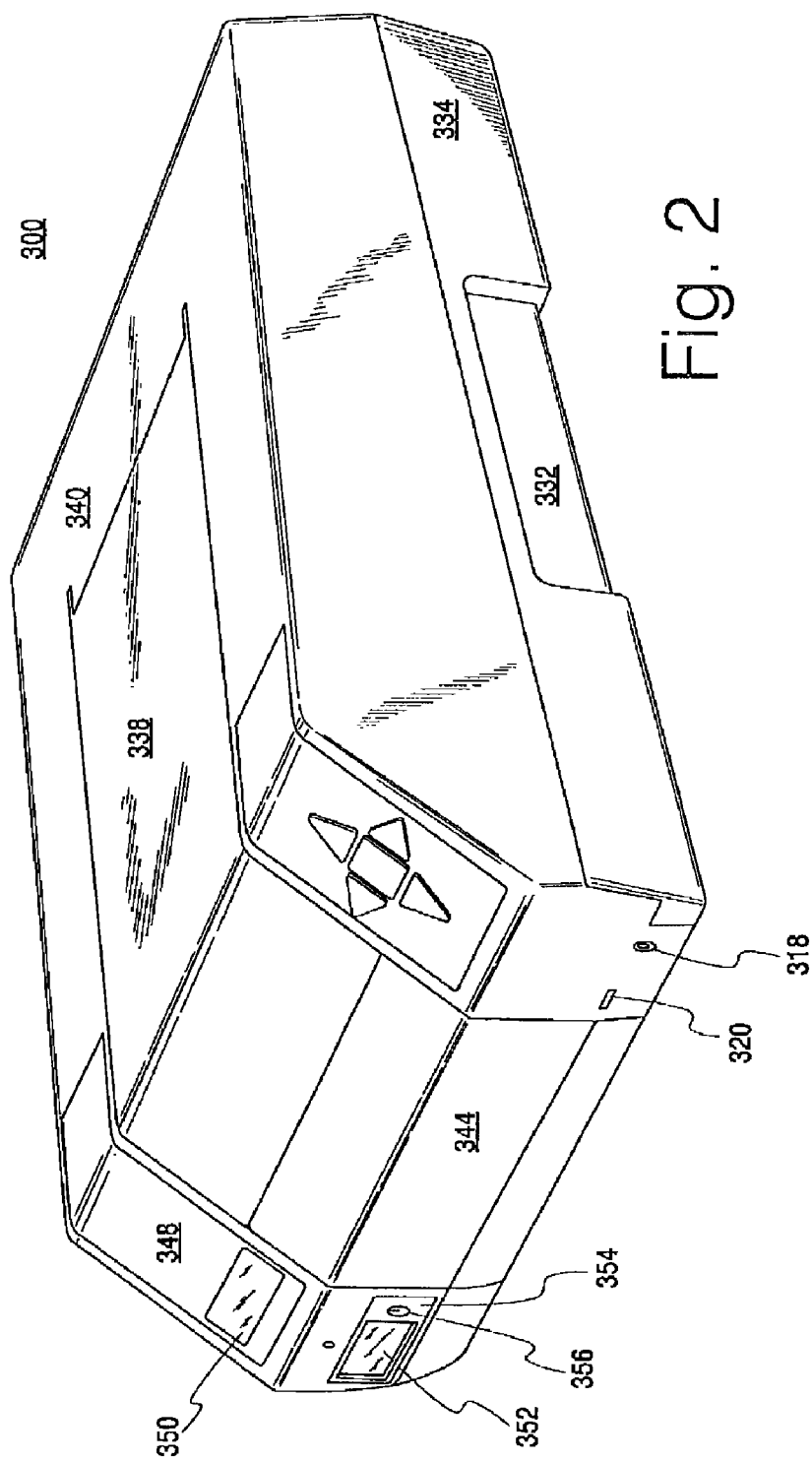
FIG. 2 is a perspective view of the voter assistance terminal of FIG. 1 shown in its closed position.

Referring now to FIG. 2, the voter assistance terminal 300 is shown in its closed or transport state. In this state, it can be easily carried via handles 332 located on both sides of its lower housing 334. The touchscreen is safely located within recess 336 and beneath the protective cover 338 hinged to the top housing 340 via hinges 342 (FIG. 19). The ballot slot 308 is also safely located behind the lower cover 344 which forms the ramp 346 to aid in the ballot insertion when the voter assist terminal 300 is in the open position.

An additional sub-panel 348 preferably comprises a message display window 350 utilizing liquid crystal or other known color display technology for displaying voter assistance terminal status and issuing prompts and instructions to the voter. It is contemplated that sub-panel 348 be interchangeable within a future sub-panel having a different message display window, or an additional sub-panel utilizing a key configuration.

Other features provided on the voter assist terminal 300 include a lockable module receiving receptacle 352 for receiving ballot data modules. A hinged door 354 secured by a key lock 356 may be provided to prevent tampering with the data module. An LED pilot light 358 provides a steady green indication to indicate AC power, a steady yellow indication to indicate battery power and a blinking red to indicate a low-battery condition.

Figure 3A:
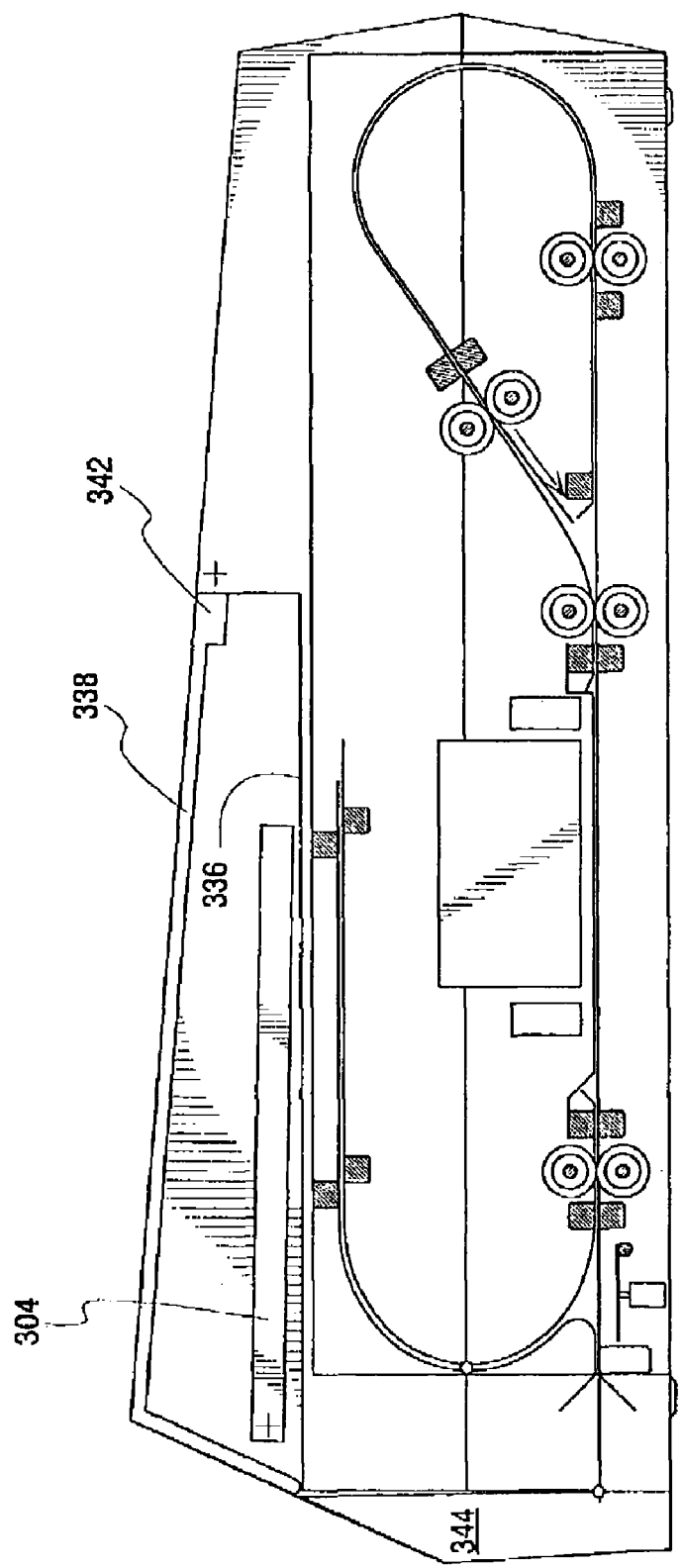

The set-up procedure of the voter-assistance terminal of the present invention, for converting the apparatus from its closed position (FIG. 2) into its open and usable position (FIG. 1), is described in FIGS. 3a-3c. Referring to the closed or transport position of FIG. 3a, the touchscreen 304 is shown safely located within recess 336 and under top cover 338. During the set-up procedure, (FIG. 3b) the top cover 338 is pivoted about pivot point 360 and the touchscreen 304 is pivoted about pivot point 362. Similarly the bottom cover 344 is pivoted about pivot point 364.

FIG. 3c illustrates the completed set-up process. In particular, top cover 338 is now fastened behind touchscreen 304 at 366 to provide support for the screen, and bottom cover 344 mates with the assembly at 368 to provide support for ramp 346. Now the voter assistance terminal is open and ready to use. When the terminal needs to be closed, the reverse process will once again transform the terminal to its closed or transport position of FIG. 2.

While a particular embodiment of the invention has been shown and described, it will be obvious to those skilled in the art that changes and modifications may be made therein without departing from the invention in its broader aspects, and, therefore, the aim in the appended claims is to cover all such changes and modifications as fall within the true spirit and scope of the invention.

I claim:

1. A ballot marking apparatus adapted to mark a user-readable physical ballot containing a plurality of contests in accordance with a plurality of voting selections made by a voter, each of the contests having a plurality of voting choices, said apparatus comprising:

a housing having a top surface, a bottom surface, a front surface, and a rear surface, wherein said housing defines a ballot receiving slot that enables insertion of said physical ballot for marking and return of said physical ballot as marked;

a printer mechanism configured to mark said physical ballot in accordance with said voting selections made by said voter;

a top cover pivotally mounted to said housing so as to pivot from an open position to a closed transport position, wherein said top cover includes an angled portion;

a bottom cover pivotally mounted to said housing so as to pivot from an open position to a closed transport position;

a touchscreen display having a front side and a back side, said touchscreen display pivotally mounted to said housing so as to pivot from an extended position to a retracted position, wherein said touchscreen display is positioned generally perpendicular to said top surface near said front surface of said housing when in said extended position such that said front side presents said voting choices to said voter and enables touch entry of said voting selections by said voter;

wherein said touchscreen display is supported at said back side by said angled portion of said top cover when said touchscreen display is in said extended position and said top cover is in said open position such that said touchscreen display does not pivot when said front side is touched by said voter;

wherein said touchscreen display is positioned between said top surface of said housing and said top cover when said touchscreen display is in said retracted position and said top cover is in said closed transport position;

wherein said bottom cover permits access to said ballot receiving slot when said bottom cover is in said open position; and wherein said bottom cover covers said ballot receiving slot when said bottom cover is in said closed transport position.

2. A ballot marking apparatus as defined in claim 1, wherein said bottom cover is disposed to support and guide the ballot into said ballot receiving slot when in said open position.

3. A ballot marking apparatus adapted to mark a user-readable physical ballot containing a plurality of contests in accordance with a plurality of voting selections made by a voter, each of the contests having a plurality of voting choices, said apparatus comprising:
- a housing having a top surface, a bottom surface, a front surface, and a rear surface, wherein said housing defines a ballot receiving slot that enables insertion of said physical ballot for marking and return of said physical ballot as marked;
- a printer mechanism configured to mark said physical ballot in accordance with said voting selections made by said voter;
- a bottom cover moveably coupled to said housing and configured to support and guide the ballot into said ballot receiving slot;
- a touchscreen display having a front side and a back side, said touchscreen display moveably coupled to said housing so as to move between an extended position and a retracted position, wherein said touchscreen display is positioned generally perpendicular to said top surface near said front surface of said housing when in said extended position such that said front side presents said voting choices to said voter and enables touch entry of said voting selections by said voter;
- a top cover moveably coupled to said housing, wherein said top cover includes an angled portion;
- wherein said touchscreen display is supported by said angled portion of said top cover at said back side when said touchscreen display is in said extended position such that said touchscreen display does not pivot when said front side is touched by said voter; and
- wherein said bottom cover, said touchscreen display and said top cover are each moveable to a position suitable for transport of said apparatus whereby said bottom cover covers said ballot receiving slot and said top cover covers said touchscreen display when in said retracted position.

4. A ballot marking apparatus adapted to mark a user-readable physical ballot containing a plurality of contests in accordance with a plurality of voting selections made by a voter, each of the contests having a plurality of voting choices, said apparatus comprising:
- a housing having a top surface, a bottom surface, a front surface, and a rear surface, wherein said housing defines a ballot receiving slot that enables insertion of said physical ballot for marking and return of said physical ballot as marked;
- a printer mechanism configured to mark said physical ballot in accordance with said voting selections made by said voter;
- a touchscreen display having a front side and a back side, said touchscreen display moveably coupled to said housing so as to pivot between an extended position and a retracted position, wherein said touchscreen display is positioned generally perpendicular to said top surface near said front surface of said housing, when in said extended position such that said front side presents said voting choices to said voter and enables touch entry of said voting selections by said voter;
- a top cover moveably coupled to said housing so as to pivot between an open position and a closed transport position, wherein said top cover includes an angled portion;
- a bottom cover moveably coupled to said housing so as to pivot between an open position and a closed transport position;
- wherein said touchscreen display is supported by said angled portion of said top cover at said back side when said touchscreen display is in said extended position such that said touchscreen display does not pivot when said front side is touched by said voter;
- wherein said touchscreen display is positioned between said top surface of said housing and said top cover when said touchscreen display is in said retracted position and said top cover is in said closed transport position such that said touchscreen display is protected during transport of said apparatus; and
- wherein said bottom cover covers said ballot receiving slot when said bottom cover is in said closed transport position such that said ballot receiving slot is protected during transport of said apparatus.

* * * * *